United States Patent [19]

Atwood

[11] Patent Number: 4,559,002
[45] Date of Patent: Dec. 17, 1985

[54] PIZZA PRESS
[76] Inventor: Harold T. Atwood, Dolton, Ill.
[21] Appl. No.: 662,054
[22] Filed: Oct. 18, 1984
[51] Int. Cl.[4] ............ B30B 11/00; A21C 11/00
[52] U.S. Cl. ................. 425/152; 425/167; 425/193; 425/394; 425/409
[58] Field of Search ............ 425/151, 152, 162, 167, 425/193, 394, 406, 409, 411

[56] References Cited

U.S. PATENT DOCUMENTS

| | | | |
|---|---|---|---|
| 3,089,188 | 5/1963 | Hoffmann | 425/167 |
| 3,669,605 | 6/1972 | Reilly | 425/193 X |
| 3,764,243 | 10/1973 | Gambill et al. | 425/167 X |
| 3,792,947 | 2/1974 | Diehl | 425/193 X |
| 3,877,859 | 4/1975 | Giagine | 425/152 |
| 3,933,089 | 1/1976 | Spooner | 425/152 X |
| 3,942,431 | 3/1976 | Goff | 425/152 X |
| 4,255,106 | 3/1981 | Anetsberger et al. | 425/152 |
| 4,417,867 | 11/1983 | Bauer | 425/406 X |

Primary Examiner—J. Howard Flint, Jr.
Attorney, Agent, or Firm—Benjamin Schlosser

[57] ABSTRACT

This invention relates to safety devices built into a machine designed to press a ball of dough into a pizza crust of uniform predetermined size.

2 Claims, 4 Drawing Figures

PIZZA PRESS

FIELD OF THE INVENTION

This invention is concerned with means for preventing an unskilled operator from getting his hand injured during the pressing operation and from getting burned when the newly formed pizza crust is being removed from the press.

SUMMARY OF THE INVENTION

The pizza press is provided with an upper and lower platen which co-act to press a ball of dough into a pizza crust. It is desirable to remove each pizza crust as quickly as possible to speed the operation and thereby minimizing the cost. All of the heat required for the pressing operation is provided by heating the upper platen. Immediately after the crust is formed the upper platen is automatically moved upwardly away from the crust. The lower platen, upon which the crust is positioned, is then manually moved pivotally away from the heated area so that the crust may be manually removed from the lower platen without danger of having the operator's hands burned. When the lower platen is moved pivotally away from the heated area it opens a micro switch that prevents operation of the machine. After a new ball of dough is placed on the lower platen, the lower platen is moved back into vertical registration with the upper platen and closes the micro switch, so that the machine is again operable when the two platens are in vertical registration. A guard member, mounted on the lower platen, cooperates with another guard member, mounted on one wall of the cabinet housing the pressing mechanism, when the upper and lower platens are in vertical registration to completely enclose the vertical space between the two platens. The guard members completely enclose the vertical space between the two platens in vertical registration to prevent the operator from getting his hand caught between the two platens.

DESCRIPTION OF THE PREFERRED EMBODIMENT

Figure 2:
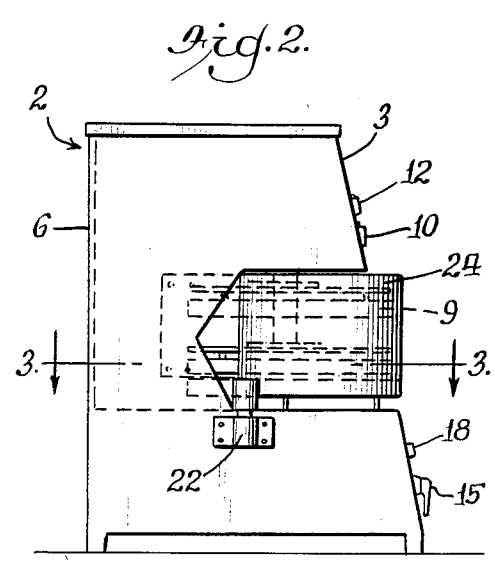
FIG. 2 is a partial side elevational view.

In the drawings, the cabinet 2, which houses the pressing mechanism, has a front wall 3, two side walls 4 and 5, and a back wall 6. The front wall and the side walls are cutaway to provide an open space, extending about half the depth of the cabinet, between the top section 7 and the bottom section 8 of the cabinet. The top section of the cabinet houses mechanism, not shown, for vertically reciprocating an upper platen 9, that is heated electrically in conventional manner. The temperature of the upper platen 9 is controlled by a thermostat control switch 10 that projects through the upper section of the front wall 3. A pilot light 11, which also projects through the upper section of the front wall 3, indicates when the temperature of the upper platen is within the desired temperature range for proper operation of the pizza press. The heated upper platen is reciprocated vertically by conventional mechanism, not shown in the drawings. The vertical movement of the platen 9 is limited in each direction by a knob 12 that projects through the upper section of the front wall 3. The length of travel of the platen 9 determines the thickness of the pizza crust 13 formed by each reciprocation of the heated upper platen 9 when a ball of dough of predetermined uniform size is positioned on a lower platen 14, herein after described, is aligned vertically with the upper platen 9 before the upper platen is moved downwardly.

The lower section of the front wall 3 has a main switch 15, a timer 16, a timer setter 17, a starter button 18 and an indicator light 19, all projecting therethrough. The timer setter 17 regulates the time interval, or dwell, between the cessation of the downward movement of the upper platen 9 and the start of its upward movement. The timer reverses the downward movement of the upper platen at the end of the dwell. The electrical circuit that operates the mechanism for reciprocating the upper platen is actuated by the starter button 18 which is inoperative except when the main switch 15 and a micro switch 20 are both in closed position. The main switch is closed manually by the operator at the start of any period of operation, but the micro switch is closed only by the lower platen 14, as hereinafter described.

The micro switch 20 is mounted on the top wall 21 of the bottom section 8 of the cabinet adjacent the side wall 5 and stays in open position whenever the lower platen 14 is out of vertical alignment with the upper platen 9. The lower platen is pivotally mounted in a socket 22 that is secured to the side wall 4. The lower platen 14, which is unheated, has a knob 23 projecting from its edge, whereby it may be manually moved about its pivot, into and out of vertical registration with the upper platen 9.

Figure 4:
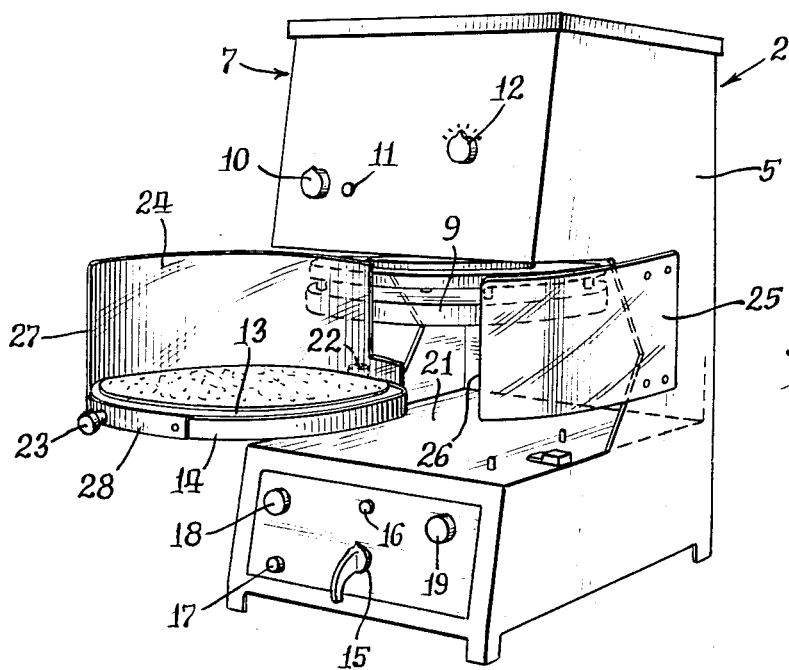
FIG. 4 is a front perspective view of the cabinet with the lower platen swing out of vertical alignment with the upper platen.

A curved guard member 24, preferably of rigid clear plastic material is secured adjacent its lower edge to the outer edge of the lower platen 14. As shown most clearly in FIG. 4, the guard member 24 does not completely encircle the lower platen, but cooperates with a similar guard member 25 that is secured to the wall 5. The guard member 25 extends forwardly from the wall 5 so that its forward edge 26 and the vertical edge 27 of the guard member 24 abut when the lower platen 14 is moved into vertical registration with the upper platen 9. The upper edges of the guard members 24 and 25 extend substantially to the lower edge of the top section 7 of the cabinet so that when the edges 26 and 27 of the guard members 24 and 25 are in abutting relationship the space between the platens 9 and 14 is completely enclosed.

The lower edge of the guard member 25 is spaced above the top wall 21 of the bottom section, section 8 a distance equal to the height of the lower platen. A tongue 29 secured to the outer edge of the lower platen and extending from the vertical edge 27 of the guard member 24 moves between lower edge of the guard member 25 and the top wall 21 when the lower platen is moved pivotally into vertical registration with the upper platen. As the tongue 29 moves under the lower edge of the guard member 25 it engages the micro switch 20 to close it. The micro switch must be closed before the machine can be operated.

Figure 1:
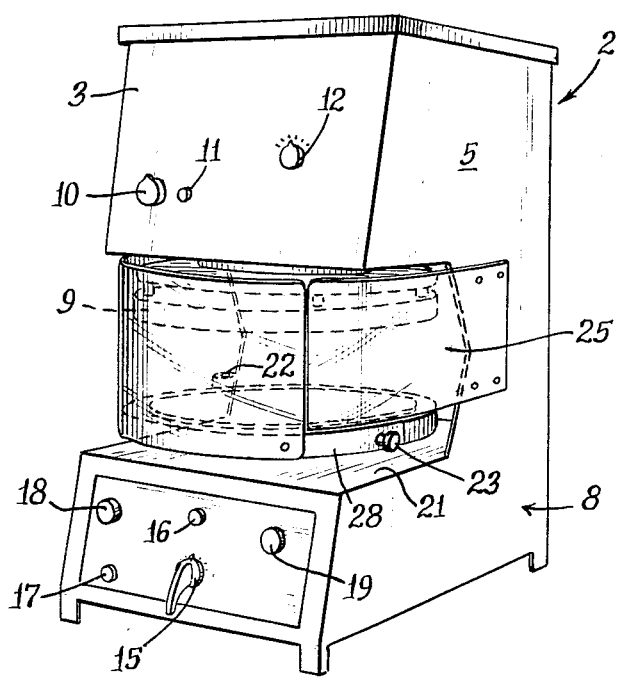
FIG. 1 is a front perspective view of the cabinet housing the pressing mechanism in operative position.
Figure 3:
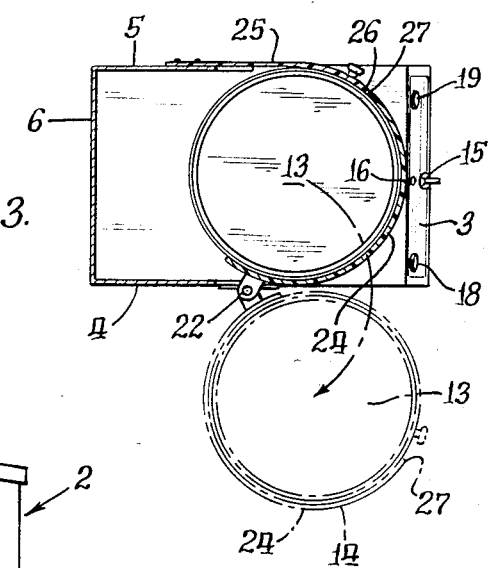
FIG. 3 is a cross-sectional view, taken along the line 3—3 of FIG. 2 and showing different positions of the lower platen.

The operation of the machine is simple. The lower platen is manually pivoted outwardly to the position shown in FIG. 4. A ball of dough of predetermined size is positioned on the lower platen which is then swung inwardly to the position shown in FIG. 1, with the guard members preventing the operator from sticking his hand between the platens. The main switch is then closed and when the pilot light 11 indicates that the upper platen is heated to the desired temperature the machine is ready for safe operation. The starter button 18 is then pressed to start the downward movement of the upper platen. After the upper platen presses the ball of dough to form a pizza crust, the upper platen moves upwardly to its initial position, and the lower platen is manually moved pivotally outward into the position of FIG. 4 so that the pizza crust may be removed from the lower platen. When the pizza crust has been removed from the lower platen, a new ball of dough is placed on the lower platen and the lower platen is swung back into the position of FIG. 1 to close the micro switch and make the machine ready for another operation.

I claim:

1. In a pizza press, a cabinet having a heated upper platen and an unheated lower platen, means for automatically moving said upper platen vertically within predetermined limits, said lower platen being pivoted to be manually moved in a horizontal plane into and out of vertical registration with said upper platen, and a micro switch mounted on said cabinet in the path of movement of said lower platen, said micro switch being adapted to remain open to prevent operation of said press when said micro switch is out of engagement with said lower platen and said lower platen being engageable with said micro switch to hold it in closed position when said lower platen is moved into vertical registration with said upper platen.

2. A pizza press, as recited in claim 1, in which said cabinet has a guard member secure to one wall thereof, and said lower platen has secured to it a guard member adapted to cooperate with said first mentioned guard member to completely enclosed the vertical space between said platen when said platens are in vertical alignment.

* * * * *